(12) United States Patent
Cansell et al.

(10) Patent No.: US 7,063,795 B2
(45) Date of Patent: Jun. 20, 2006

(54) METHOD FOR STARTING UP A SYSTEM FOR TREATING WASTE BY HYDROTHERMAL OXIDATION

(75) Inventors: François Cansell, Pessac (FR); Manuel Bottreau, Pessac (FR)

(73) Assignee: Centre National de la Recherche Scientifique (C.N.R.S.), Paris (FR)

( * ) Notice: Subject to any disclaimer, the term of this patent is extended or adjusted under 35 U.S.C. 154(b) by 0 days.

(21) Appl. No.: 10/483,058

(22) PCT Filed: Jul. 10, 2002

(86) PCT No.: PCT/FR02/02428

§ 371 (c)(1),
(2), (4) Date: Jun. 30, 2004

(87) PCT Pub. No.: WO03/006388

PCT Pub. Date: Jan. 23, 2003

(65) Prior Publication Data

US 2004/0238460 A1 Dec. 2, 2004

(30) Foreign Application Priority Data

Jul. 10, 2001 (FR) .................................. 01 09124

(51) Int. Cl.
*C02F 1/72* (2006.01)

(52) U.S. Cl. ..................... 210/759; 210/761; 210/766

(58) Field of Classification Search ................ 210/759, 210/761, 762, 765
See application file for complete search history.

(56) References Cited

U.S. PATENT DOCUMENTS

| | | | |
|---|---|---|---|
| 4,721,575 A | 1/1988 | Binning et al. | |
| 4,793,919 A | 12/1988 | McCorquodale | |
| 4,853,136 A * | 8/1989 | Roussel et al. | 210/761 |
| 5,252,224 A | 10/1993 | Modell et al. | |
| 5,582,715 A | 12/1996 | McBrayer, Jr. et al. | |
| 5,674,405 A * | 10/1997 | Bourhis et al. | 210/761 |
| 5,770,174 A | 6/1998 | Eller et al. | |
| 6,017,460 A * | 1/2000 | Eller et al. | 210/739 |
| 6,475,396 B1 * | 11/2002 | Wofford et al. | 210/758 |
| 6,572,759 B1 * | 6/2003 | Nishimura et al. | 205/687 |
| 6,709,602 B1 * | 3/2004 | Spritzer et al. | 210/750 |
| 6,878,290 B1 * | 4/2005 | Joussot-Dubien et al. | 210/761 |
| 6,929,752 B1 * | 8/2005 | Cansell | 210/752 |

FOREIGN PATENT DOCUMENTS

FR 2 813 599 3/2002

* cited by examiner

*Primary Examiner*—Peter A. Hruskoci
(74) *Attorney, Agent, or Firm*—Young & Thompson

(57) ABSTRACT

A method for starting up a system for oxidating organic bodies. The system includes a tubular body wherein an aqueous body is injected into the inlet thereof at a pressure P1 the tubular body having a first zone extending the inlet thereof, a second zone into which an oxidating compound can be injected into the output thereof. The inventive method includes the following steps: a first amount of thermal energy Q1 is provided in the first zone, the amount of thermal energy being able to raise the temperature of the liquid flowing through the tubular body from an initial temperature to a higher temperature T1; and a determined amount of a combustible mixture which can react at the intermediate temperature T1 in order to provide an amount of thermal energy Q2 bringing the temperature of the liquid to a reaction temperature T2 is injected.

18 Claims, 2 Drawing Sheets

METHOD FOR STARTING UP A SYSTEM FOR TREATING WASTE BY HYDROTHERMAL OXIDATION

Figure 1:
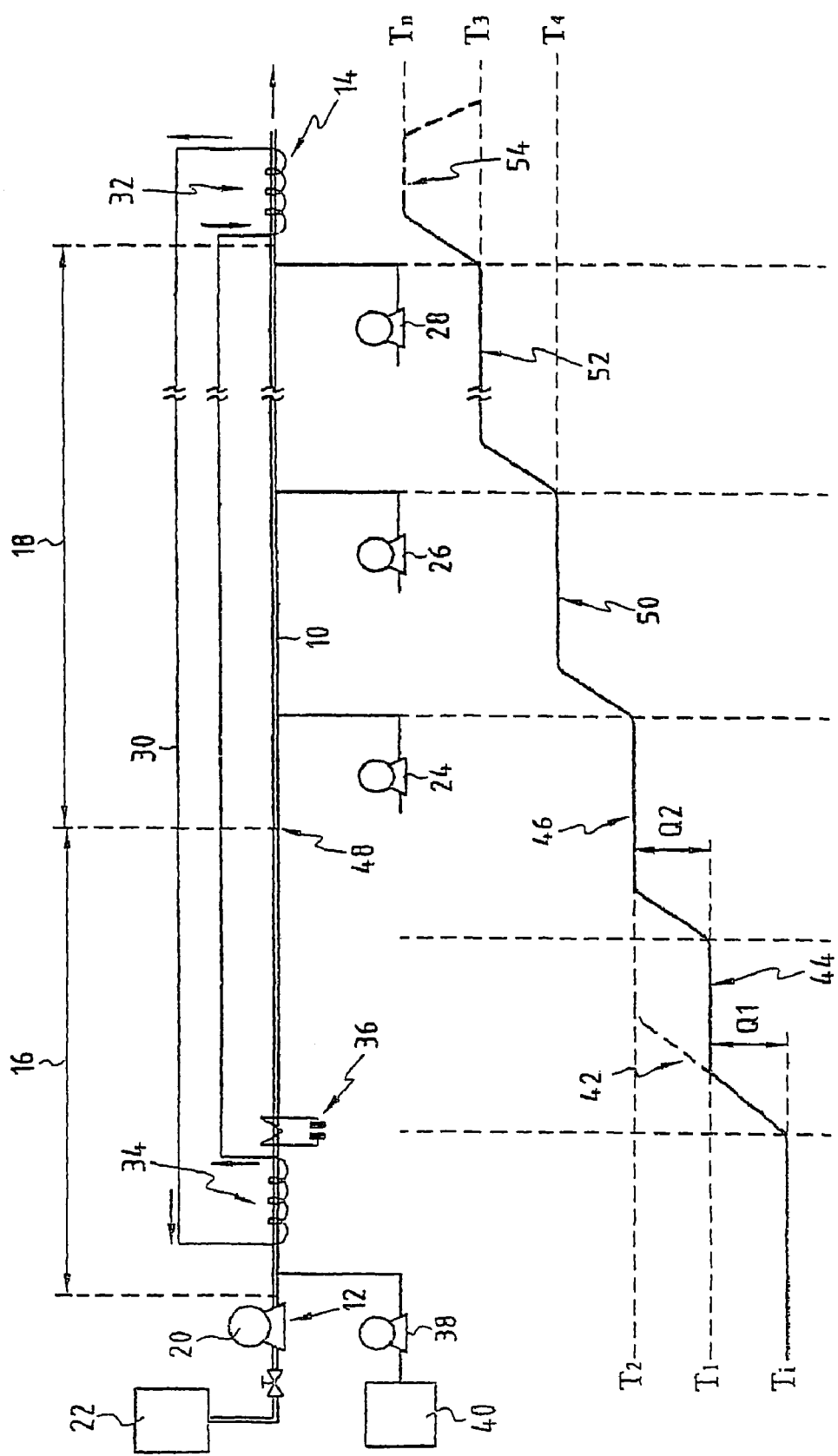

This invention relates to a method (process) for starting up a system intended for the oxidation of organic bodies present in an aqueous effluent and a start-up unit intended for implementation of the said method.

One envisaged field of application is in particular, but not exclusively, the field of the starting up of systems able to convert organic bodies present in small quantities in aqueous effluents, into gases, said gases being capable of being burnt to provide energy or of being released into the atmosphere without danger.

Systems intended for the oxidation of organic bodies present in aqueous effluents are known. One of the first stages in these processes generally consists of preheating the aqueous mixture containing the said bodies so that their degradation can begin as soon as the oxidising agent is injected. In normal operation of the system the thermal energy produced by degradation of the organic bodies is captured to preheat the aqueous mixture.

However normal operation of the system is likely to be interrupted and restarted, preheating of the aqueous effluent only being capable of being effected by associated means, generally of the thermoelectric type, because there is no available thermal energy from degradation. Thus the oxidation system must include thermoelectric or other preheating means, which are significant and costly and whose period of use is relatively short in comparison with the time for treatment of the aqueous effluent, which can amount to several days and during which the oxidation reaction produces sufficient energy to preheat the aqueous effluent.

Then, one problem which arises and which this invention aims to solve is the reducing of the magnitude of the preheating means necessary to start up the system intended to oxidise the organic bodies in order to reduce the cost of the system without compromising the said start-up.

To that end, a first object of the invention is to provide a process for the start-up of a system intended for the oxidation of organic bodies present in an aqueous effluent, the said system comprising a tubular body into the inlet of which the said aqueous effluent can be injected at a pressure $P1$ corresponding to at least the critical pressure of the said aqueous effluent, the said tubular body having a first zone extending the said inlet, a second zone into which an oxidising composition is capable of being injected, and an outlet; in which process: it is provided to the first zone of the said tubular body a first quantity of thermal energy $Q1$, which is capable of raising the temperature of the fluid passing through the said tubular body from an initial temperature to a higher intermediate temperature $T1$; and it is injected into the said tubular body at the said pressure $P1$, between the said inlet and the said first zone of the said tubular body, a definite quantity of a combustible mixture capable of reacting at a temperature lower than the oxidation temperature of the organic bodies and of which at least a first part is capable of reacting at the said intermediate temperature $T1$ to provide a second quantity of thermal energy $Q2$ raising the temperature of the said fluid to a reaction temperature $T2$ in such a way that injection of the said oxidising composition into the said second zone brings about at least the reaction of a second part of the said combustible mixture providing a third quantity of energy $Q3$ at the said outlet of the said tubular body, a fraction of the said third quantity of energy $Q3$ being capable of being applied to the said first zone of the said tubular body to raise the temperature of the fluid passing through it at least from the said initial temperature to the said intermediate temperature $T1$.

Thus, a feature of the start-up method lies in the manner of producing the preheating thermal energy necessary for degradation of the organic bodies in the aqueous effluent through a combustible mixture which is capable of easily reacting at a temperature $T1$ below temperature $T2$ at which the said organic bodies oxidise and which provides the energy necessary to raise the said first organic bodies to at least this temperature $T1$. In this way it is no longer necessary to use major associated preheating means to raise the temperature of the aqueous effluent to the said temperature $T2$, but merely preheating means which are capable of producing a first quantity of energy $Q1$ raising the temperature of the effluent to a temperature $T1$ which is less than $T2$.

Advantageously, one stops the providing of the said first quantity of energy $Q1$ into the said first zone of the said tubular body when the said fraction of the said third quantity of energy $Q3$ is at least equal to $Q1$. Thus, as soon as at least the reaction of the said second part of the said combustible mixture makes it possible to produce sufficient energy to replace the associated preheating means, the latter are switched off.

Preferably, one stops the injection of the said combustible mixture and one injects the said aqueous effluent into the inlet of the said tubular body when the said fraction of the said third quantity of energy $Q3$ is equal to at least the sum of $Q1$ and $Q2$ so as to raise the temperature of the fluid passing through the said tubular body from the said initial temperature to the said reaction temperature $T2$. As will be explained in greater detail in the rest of the description below, when the thermal energy produced by the reaction of the combustible mixture has reached a certain threshold corresponding to thermal equilibrium in the system only aqueous effluent is injected so as to oxidise the organic bodies which it contains. The thermal energy produced by the degradation of these organic bodies in the effluent is alone sufficient to preheat the aqueous effluent and to raise it to the reaction temperature $T2$.

According to a particularly advantageous embodiment, the said combustible mixture comprises a combustible material and an oxidising agent in a substoichiometric proportion so that a first portion of the said combustible material reacts with the said oxidising agent when the said combustible mixture is raised to the said temperature $T1$ to provide the said second quantity of energy $Q2$ and the second portion of the said combustible material reacts with the said oxidising composition. This feature makes it possible to reserve a second portion of combustible material which is capable of reacting with the oxidising composition and thus produce the said quantity of energy $Q3$, a fraction of which makes preheating possible.

In a particularly advantageous manner, the said combustible material and the said oxidising agent can release a quantity of energy greater than 3 megaJoules per mole of molecules of the combustible material. In this way small quantities of combustible material are necessary to start up the system. And preferably the said combustible material has an activation energy of less than 1 kiloJoule per mole of molecules of the said combustible material. Thus the intermediate temperature $T1$ required at the start of the reaction is relatively low, although a small quantity of energy $Q1$ is required, thus correspondingly decreasing the necessary magnitude of the associated preheating means.

According to a particular embodiment of the invention the said oxidising agent comprises hydrogen peroxide, which is relatively cheap and has a strong oxidising power under the temperature and pressure conditions of the reaction. Preferably the said combustible material comprises glucose, the cost of which is also advantageous and which is easy to use.

Advantageously the said second quantity of energy Q2 which the said combustible mixture is capable of providing represents between 40 and 80% of the sum of Q1 and Q2 so that the reduction in size of the preheating means necessary for start-up is substantial.

According to a preferred embodiment, the said combustible mixture is injected into the inlet of the said tubular body in the same way as the aqueous effluent.

A second object of this invention is to provide a start-up unit implementing the process according to the invention according to its first object. To this end, the said start-up unit comprises means for providing within the said first zone of the said tubular body a first quantity of thermal energy Q1 which is capable of raising the temperature of the fluid passing through the said tubular body from an initial temperature to a higher intermediate temperature T1 and means to inject a definite quantity of a combustible mixture of which at least a first part is capable of reacting at the said intermediate temperature T1 to provide a second quantity of thermal energy Q2 raising the temperature of the said fluid to a reaction temperature T2 into the said tubular body at the said pressure P1 between the said inlet and the first zone of the said tubular body in such a way that injection of the said oxidising composition into the said second zone produces at least the reaction of a second part of the said combustible mixture providing a third quantity of energy Q3 at the said outlet from the said tubular body, a fraction of the said third quantity of energy Q3 being capable of being applied to the said first zone of the said tubular body to raise the temperature of the fluid passing through it at least from the said initial temperature to the said intermediate temperature T1.

Thus, according to its second object, the invention relates to a start-up unit for a system comprising means for injecting a combustible mixture into the tubular body and means to provide a first quantity of energy Q1 which is less than the quantity of energy which has to be supplied with the systems of the prior art to preheat the fluid, because reaction of the combustible mixture, which is strongly exothermic, provides the energy necessary to make up for the difference. In this way the magnitude of the means to provide thermal energy can be reduced and as a consequence so also can the cost of these means.

Advantageously the said means for injecting a specific quantity of a combustible mixture comprise means for regulating the flow of the said combustible mixture so as to regulate the said first quantity of energy Q1 required to raise the temperature of the fluid passing through the tubular body. Furthermore, in a particular embodiment, aqueous effluent and the combustible fluid are injected into the tubular body simultaneously and the said means for regulation of the flow of the said combustible mixture make it possible to adjust the quantities necessary.

Preferably, the said means to provide the said first quantity of thermal energy Q1 to the said aqueous effluent comprises a thermoelectric generator which is of one piece with the said tubular body. In this way it is easy to control the said means through a contact or a relay within the context of a process for controlling start-up as a whole.

According to a particularly advantageous arrangement the start-up unit comprises a heat exchanger to take the said fraction of the said third quantity of energy Q3 and apply it to the said first zone of the said tubular body.

Figure 2:
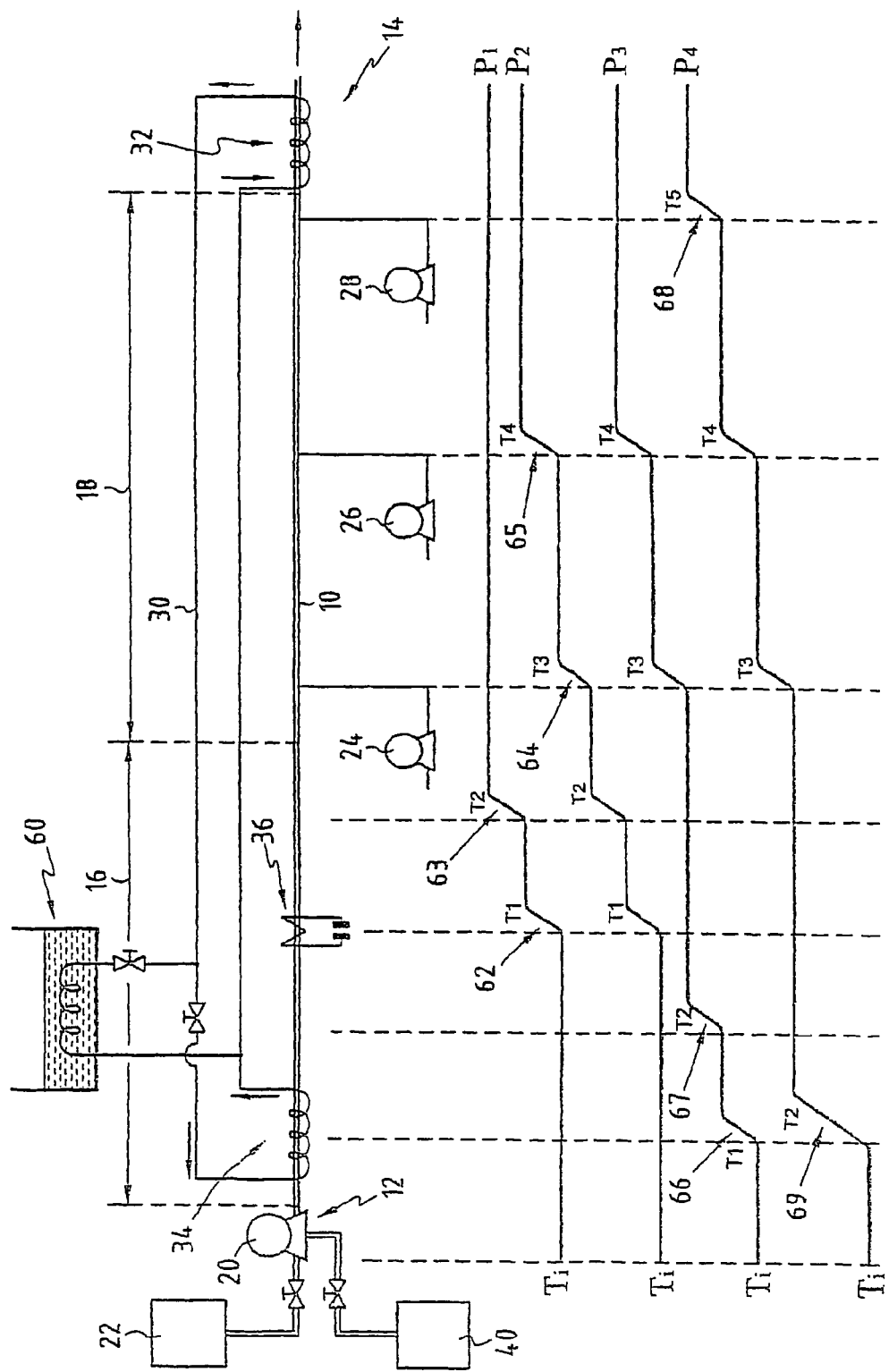

Other advantages and features of the present invention will emerge from the following detailed description which is given with reference to the appended drawings which are provided purely by way of non-limiting example and in which:

FIG. 1 is a schematic view showing the system and a start-up unit according to the invention, as well as the general thermal profile corresponding to the said installation at a particular stage, and FIG. 2 is a schematic view showing the system and the start-up unit in accordance with a particular embodiment of the invention, together with four thermal profiles corresponding to four stages of the start-up process.

With reference to FIG. 1, the constituent components of the start-up unit according to the invention and then how these units act together and the general thermal profile which results will be described.

The system illustrated in FIG. 1 comprises a tubular body 10 having an inlet 12 and an outlet 14 between which there are a first zone 16 and a second zone 18. At inlet 12 of tubular body 10 a pump 20 is used to inject an aqueous effluent flowing from tank 22 at a pressure P1 corresponding to at least the critical pressure of the said aqueous effluent into tubular body 10. In the second zone 18 of tubular body 10 three injection means 24, 26, 28 through which an oxidising composition can be injected into tubular body 10 at three injection points spaced apart are shown, the number of injection points obviously not necessarily being restricted to three.

A heat exchanger 30 has a first end 32 which is capable of absorbing the thermal energy dissipated close to outlet 14 of tubular body 10 and a second end 34 which is capable of transmitting at least a fraction of the said dissipated thermal energy to the first zone 16 of tubular body 10 close to inlet 12.

The start-up unit comprises thermoelectric means 36 which are capable of providing a first quantity of energy Q1 to first zone 16 of tubular body 10 and means 38 to inject the combustible mixture contained in a tank 40. Preferably the point of injection of the combustible mixture is located between inlet 12 and the second end 34 of heat exchanger 30 or thermoelectric means 36.

When the system is operating normally, after the start-up stage, pump 20 continuously injects aqueous effluent containing organic bodies at a pressure P1 higher than the critical pressure of the effluent into tubular body 10 in such a way that the pressure is higher than P1 between the inlet 12 and the outlet 14 of tubular body 10. After injection the injected aqueous effluent is raised to a temperature T2 according to the profile in graph 42, dashed lines, through the second end 34 of heat exchanger 30 which transfers a fraction of the thermal energy which it receives at its first end 32. This thermal energy is produced by oxidation of the organic bodies present in the aqueous effluent which after having been raised to temperature T2 react progressively with the oxidising composition which is injected by the injection means in order to oxidise all the organic bodies present in the effluent. Thus the temperature within second zone 18 of the tubular body increases progressively after each injection of oxidising composition to pass from temperature T2 to temperature T3 after the first injection, from temperature T3 to temperature T4 after the second injection and from temperature T(n−1) to Tn after the (n−2)th injection. In a preferred embodiment of the invention injections of the oxidising composition are adjusted in such a way that the temperature increases continuously between T2 and Tn, the aqueous effluent passing from a subcritical condition into the supercritical domain.

The invention relates specifically to start-up of the system and one of its features lies in injection of the combustible mixture which through reacting acts as a replacement for significant preheating means. In order to fulfil its role this combustible mixture must have a number of particular features. In fact in order for the process to be advantageous this mixture must react at an intermediate temperature T1 which is as low as possible, in any event below reaction temperature T2 at which the organic bodies present in the aqueous effluent are able to be oxidised.

Furthermore, in a particularly advantageous fashion, the combustible mixture contains a combustible material and an oxidising agent in substoichiometric proportion in relation to the combustible material in such a way that when the combustible mixture is at intermediate temperature T1 all of the oxidising agent reacts with part of the combustible material according to an oxidation reaction producing thermal energy and the other part remains available in order to be oxidised.

Of course after part of the combustible mixture has reacted with the oxidising agent it will contain oxidation products, in particular carbon dioxide gas. In the description combustible mixture also refers to combustible mixture in which the combustible material has been partly or wholly oxidised, and the oxidation products which it contains.

According to a particular embodiment the combustible mixture is an aqueous mixture containing an organic compound constituting the combustible material whose concentration is less than its solubility in the said aqueous mixture and an oxidising agent which is also soluble in the aqueous mixture, for example hydrogen peroxide. The said organic compound must have a high oxidation enthalpy, for example greater than an absolute value of 3 megaJoules per mole of compound so as to release a great deal of thermal energy within the aqueous mixture.

Furthermore, the activation energy of the mixture of the organic compound/oxidising agent must be sufficiently low, for example less than 1 kiloJoule per mole of the said organic compound, for the reaction to start at the said temperature T1. Preferably the activation energy is substantially equal to 0.8 kiloJoules per mole.

In a particularly advantageous fashion the combustible mixture comprises substantially 65% of water, 30% of hydrogen peroxide and 5% of glucose. Thus the enthalpy of the reaction is 3.6 kJ/mole and the activation energy is 0.807 kJ/mole.

Referring again to FIG. 1, the method for starting up the system according to the invention which precedes the normal operation described above will be described in a general way.

During this start-up stage the combustible mixture is first injected alone at an initial temperature T1 into the first zone 16 upstream from preheating means 34 and 36 at a pressure P1 and thermoelectric means 36 are switched on in order to provide a first quantity of energy Q1 to the combustible mixture passing through tubular body 10 and thermoelectric means 36. In this way the combustible mixture reaches a temperature T1 according to graph 44, and then as a result of the oxidation reaction which the combustible material undergoes at this temperature T1 which produces an energy Q2 the mixture then reaches temperature T2 according to graph 46.

When the combustible mixture reaches the end 48 of first zone 16 and is at temperature T2 only part of the combustible material has reacted, even though injection of a first portion of the oxidising composition through injection means 24 brings about oxidation of a first fraction of the other part of the combustible material and the generation of thermal energy. In this way the combustible mixture reaches temperature T3 according to graph 50, and then temperature T4 according to graph 52 when a second portion of the oxidising composition which oxidises a second fraction of the other part of the combustible material is injected and a temperature Tn according to graph 54 when an $n^{th}$ portion of the oxidising composition which oxidises an $n^{th}$ fraction of the other part of the combustible material is injected.

When tubular body 10 reaches temperature Tn at outlet 14 and second end 34 of heat exchanger 30 is capable of providing the combustible mixture with a quantity of energy sufficient to raise it from the initial temperature T1 to the reaction temperature T2 thermal equilibrium has substantially been achieved within the system and thermoelectric means 36 are switched off, aqueous effluent containing the organic bodies is injected into inlet 12 of tubular body 10 and the injection of combustible mixture is stopped.

Now that the method for starting the system according to the invention has been described in a general way, the various stages in the process of start-up before thermal equilibrium is achieved in the system will be described according to a particular embodiment and with reference to FIG. 2.

FIG. 2 illustrates tubular member 10 at the inlet 12 of which the aqueous effluent and/or the combustible mixture contained in tanks 22 and 40 respectively are injected. Conversely the heat exchanger has control means 60 designed to modulate the fraction of thermal energy which is applied to first zone 16 of tubular body 10 close to inlet 12. Furthermore only three injection means 24, 26, 28 are provided for the oxidising composition.

The four main stages in the start-up process according to this embodiment will be described with reference to the four thermal profiles P1, P2, P3, P4 alongside tubular member 10.

When the system is at rest tubular body 10 and heat exchanger 30 are at ambient temperature, the aqueous effluent and the combustible mixture are at initial temperature T1 which is substantially equal to ambient temperature.

During the first temporary stage of the start-up method according to the invention only the combustible mixture is injected into the inlet 12 of tubular body 10 at a pressure which is equal to at least P1 and the thermoelectric means are switched on so as to provide the quantity of energy Q1 to the fluid passing through first zone 16. The means for injecting the oxidising composition are not activated. Thus, with reference to profile P1, the energy Q1 provided by thermoelectric means 36 is capable of raising the temperature of the combustible mixture, which is initially at temperature T1, to the temperature T1 according to graph portion 62. Then oxidation of a first part of the combustible material brought about by thermal energy Q1 produces a second quantity of energy Q2 which raises the temperature of the combustible mixture to temperature T2 according to graph portion 63. The thermal profile is substantially constant in the second zone of the tubular body during this first stage because all the oxidising agent has been consumed and the oxidising composition has not been injected.

During the second stage which follows the first, the thermal profile of the system corresponding to P2, only the first two injection means 24, 26 for the oxidising composition are in use. In this way the second part of the combustible material which is not oxidised in first zone 16 on account of lack of oxidising agent is partly oxidised by two portions of oxidising composition corresponding to the use of injection means 24 and 26, so that the thermal energy produced by the oxidation raises the temperature of the combustible mixture, first raising it to temperature T3 according to graph portion 64 and then to temperature T4 according to graph portion 65. The temperature remains constant at the end of second zone 18 of the reactor.

During the transition between the first stage and the second stage the thermal profiles of first zone 16 of tubular body 10 are substantially identical, whereas in the third stage thermal profile P3 in first zone 16 is different.

It is as a result of the thermal energy produced by the reaction of the oxidising composition with the combustible mixture in the second stage that the second end 34 of thermal exchanger 30 is capable of providing a quantity of energy equivalent to Q1 to raise the temperature of the combustible mixture from the initial temperature T1 to the intermediate temperature T1 according to graph portion 66. Obviously this energy also makes oxidation of the first part of the combustible material possible and has the consequence of increasing the temperature of the combustible mixture to temperature T2 according to graph portion 67. Thus thermoelectric means 36 can be switched off. The thermal profile of second zone 18 of tubular body 10 remains substantially unchanged in comparison with the second stage.

The last stage, corresponding to thermal profile P4, constitutes the transition stage between the injection of combustible mixture and the injection of aqueous effluent containing the organic bodies which are to be oxidised. During this stage the last injection means 28 for the oxidising composition are activated so as to oxidise the last portion of the combustible material contained in the combustible mixture and thus the energy produced increases the temperature of the said mixture to temperature T5 according to graph portion 68. Thus the second end 34 of thermal exchanger 30 is capable of providing a quantity of energy sufficient to directly raise the combustible mixture, according to graph portion 69, from the initial temperature T1 to the reaction temperature T2 at which the combustible material can be oxidised by the oxidising composition.

In this way the system reaches thermal equilibrium and it is possible to change over from the injection of combustible mixture to the injection of aqueous effluent.

It will be understood that the thermal profiles of tubular body 10 do not change in a discontinuous way between each stage. Conversely control of the injection means or thermoelectric means can be applied in an all-or-nothing way.

In a particularly advantageous way the start-up unit for the system comprises means for measuring the temperature of tubular body 10 and the control means so as to automatically control the method of start-up according to the invention.

In order to do this tubular body 10 comprises a first temperature sensor between inlet 12 and second end of heat exchanger 30, a second sensor between said second end 34 and thermoelectric means 36, a third sensor between thermoelectric means 34 and the first point at which the oxidising composition is injected by injection means 24, and a fourth, fifth and sixth after each injection point for the oxidising composition.

Furthermore the control means comprise comparison means to compare the temperatures measured by the sensors and control means to control the various injection means and thermoelectric means.

In a particular embodiment the value of temperature T1 measured after preheating of the combustible mixture by thermoelectric means 36 lies between 80 and 120° C., for example 100° C., and the value of intermediate temperature T2 measured after reaction of the first part of the combustible material lies between 230 and 270° C., for example 250° C. According to this embodiment the value of the temperature measured after the first injection of oxidising composition lies between 280 and 320° C., for example 300° C., after the second injection it lies between 380 and 420° C., for example 400° C., and after the third injection it lies between 530 and 570° C., for example 550° C.

Thus by considering the aqueous effluent to be comparable to water it is felt that it reaches a supercritical condition after the second injection.

The invention is not restricted to the embodiments described above, and, in particular, it is contemplated that the aqueous effluent and the combustible mixture may be coinjected under certain conditions, for example when the concentration of organic bodies in the aqueous effluent varies in the course of treatment and it is necessary to maintain the system in thermal equilibrium.

Furthermore a system may be envisaged in which the tubular body has enlarged zones in order to increase the residence time of the reaction mixture.

The invention claimed is:

1. Process for starting up a system intended for the oxidation of organic bodies present in an aqueous effluent, said system comprising a tubular body (10) into the inlet (12) of which said aqueous effluent can be injected at a pressure P1 corresponding to at least the critical pressure of said aqueous effluent, said tubular body (10) having a first zone (16) extending said inlet (12), a second zone (18) into which an oxidising composition can be injected, and an outlet (14), said process comprising the steps of:
providing to said first zone (16) of said tubular body (10), a first quantity of thermal energy Q1, which is capable of raising the temperature of said aqueous effluent passing through said tubular body (10) from an initial temperature to a higher intermediate temperature T1, which is below a temperature at which said organic bodies oxidize and providing a definite quantity of a combustible mixture which is capable of reacting at a temperature lower than an oxidation temperature of the organic bodies and of which at least a first part can react at said intermediate temperature T1 to provide a second quantity of thermal energy Q2 raising the temperature of said aqueous effluent to a reaction temperature T2 and is injected into said tubular body (10) at said pressure P1 between said inlet (12) and said zone (16) of said tubular body (10) in such a way that injection of said oxidising composition into said second zone (18) brings about reaction of at least a second part of said combustible mixture providing a third quantity of energy Q3 at said outlet (14) from said tubular body (10), a fraction of said third quantity of energy Q3 being applied to said first zone (16) of said tubular body (10) to raise the temperature of the aqueous effluent passing through it at least from said initial temperature to said intermediate temperature T1.

2. The process of claim 1, further comprising stopping providing of said first quantity of energy Q1 to said first zone (16) of said tubular body (10) when said fraction of said third quantity of energy Q3 is equal to at least Q1.

3. The process of claim 2, further comprising stopping an injection of said combustible mixture and injecting said aqueous effluent at the inlet (12) to said tubular body (10) when said fraction of said third quantity of energy Q3 is equal to at least the sum of Q1 and Q2 such as to raise the temperature of the fluid passing through said tubular body (10) from said initial temperature to said reaction temperature T2.

4. The process of claim 1, wherein said combustible mixture comprises a combustible material and an oxidising agent in substoichiometric proportion so that a first portion of said combustible material reacts with said oxidising agent when said combustible mixture is raised to said temperature T1 to provide said second quantity of energy Q2 and the second portion of said combustible material reacts with said oxidising composition.

5. The process of claim 4, wherein said combustible material and said oxidising agent are capable of releasing a quantity of energy in excess of 3 megaJoules per mole of molecules of combustible material.

6. The process of claim 4, wherein said combustible material has an activation energy of less than 1 kiloJoule per mole of molecules of said combustible material.

7. The process of claim 4, wherein said oxidising agent is hydrogen peroxide.

8. The process of claim 1, wherein said combustible material comprises glucose.

9. The process of claim 1, wherein said second quantity of energy Q2 which said combustible mixture is capable of providing represents between 40 and 80% of the sum of Q1 and Q2.

10. The process of claim 1, wherein said combustible mixture is injected into the inlet (12) of said tubular body (10).

11. Process for starting up a system intended for the oxidation of organic bodies present in an aqueous effluent, said system comprising a tubular body (10) into the inlet (12) of which said aqueous effluent can be injected at a pressure P1 corresponding to at least the critical pressure of said aqueous effluent, said tubular body (10) having a first zone (16) extending said inlet (12), a second zone (4) into which an oxidising composition can be injected, and an outlet (14),
said process comprising the steps of:
providing to said first zone (16) of said tubular body (10), a first quantity of thermal energy Q1 capable of raising the temperature of a aqueous effluent passing through the tubular body (10) from an initial temperature to a higher intermediate temperature T1;
providing a definite quantity of a combustible mixture capable of reacting at a temperature lower than an oxidation temperature of the organic bodies and of which at least a first part can react at said intermediate temperature T1 to provide a second quantity of thermal energy Q2 raising the temperature of said fluid to a reaction temperature T2 and is injected into said tubular body (10) at said pressure P1 between said inlet (12) and said zone (16) of said tubular body (10) in such a way that injection of said oxidising composition into said second zone (18) brings about reaction of at least a second part of said combustible mixture providing a third quantity of energy Q3 at said outlet (14) from said tubular body (10), a fraction of said third quantity of energy Q3 being applied to said first zone (16) of said tubular body (10) to raise the temperature of the fluid passing through it at least from said initial temperature to said intermediate temperature T1;
stopping providing of said first quantity of energy Q1 to said first zone (16) of said tubular body (10) when said fraction of said third quantity of energy Q3 is equal to at least Q1; and
stopping an injection of said combustible mixture and injecting said aqueous effluent at the inlet (12) to said tubular body (10) when said fraction of said third quantity of energy Q3 is equal to at least the sum of Q1 and Q2 such as to raise the temperature of the fluid passing through said tubular body (10) from said initial temperature to said reaction temperature T2.

12. The process of claim 11, wherein said combustible mixture comprises a combustible material and an oxidising agent in substoichiometric proportion so that a first portion of said combustible material reacts with said oxidising agent when said combustible mixture is raised to said temperature T1 to provide said second quantity of energy Q2 and the second portion of said combustible material reacts with said oxidising composition.

13. The process of claim 11, wherein said combustible material and said oxidising agent are capable of releasing a quantity of energy in excess of 3 megaJoules per mole of molecules of combustible material.

14. The process of claim 11, wherein said combustible material has an activation energy of less than 1 kilojoule per mole of molecules of said combustible material.

15. The process of claim 11, wherein said oxidising agent is hydrogen peroxide.

16. The process of claim 11, wherein said combustible material comprises glucose.

17. The process of claim 11, wherein said second quantity of energy Q2 which said combustible mixture is capable of providing represents between 40 and 80% of the sum of Q1 and Q2.

18. The process of claim 11, wherein said combustible mixture is injected into the inlet (12) of said tubular body (10).

* * * * *